United States Patent [19]

Kallestad

[11] Patent Number: 4,652,173

[45] Date of Patent: Mar. 24, 1987

[54] SELF-INFLATING OIL SPILL BOOM

[75] Inventor: John Kallestad, Cocoa Beach, Fla.

[73] Assignee: Acme/Containment Systems Corporation, Tulsa, Okla.

[21] Appl. No.: 816,368

[22] Filed: Jan. 6, 1986

[51] Int. Cl.[4] .............................................. E02B 15/04
[52] U.S. Cl. ....................................... 405/69; 405/72
[58] Field of Search ........................ 405/63, 66, 68, 69, 405/72; 210/242.3, 923, 924

[56] References Cited

U.S. PATENT DOCUMENTS

| 2,200,552 | 5/1940 | Hook | 405/72 X |
| 3,686,869 | 8/1972 | Manuel | 405/69 |
| 3,798,911 | 3/1974 | Oberg | 405/69 |
| 3,922,860 | 12/1975 | Tanksley | 405/66 |

FOREIGN PATENT DOCUMENTS 2358634  5/1974  Fed. Rep. of Germany ........ 405/69

Primary Examiner—David H. Corbin
Attorney, Agent, or Firm—Head; Johnson; Stevenson

[57] ABSTRACT

A collapsible boom for use in confining oil spills on water formed of an elongated curtain of flexible material having along the upper edge a tubular portion and along the lower edge a flexible ballast, such as a chain, the curtain containing a plurality of spaced-apart short length cylindrical floats in the upper tubular edge, each float having a passageway therethrough permitting the flow of air through the float and to all parts of the interior of the upper tubular edge, and at least one closure cap permitting, as the curtain is expanded, air to flow into the upper tubular edge so that the boom when placed on water will float and, when removed from water and collapsed into a stored position will permit air to escape, the opening being closeable while the boom is in use on water.

9 Claims, 11 Drawing Figures

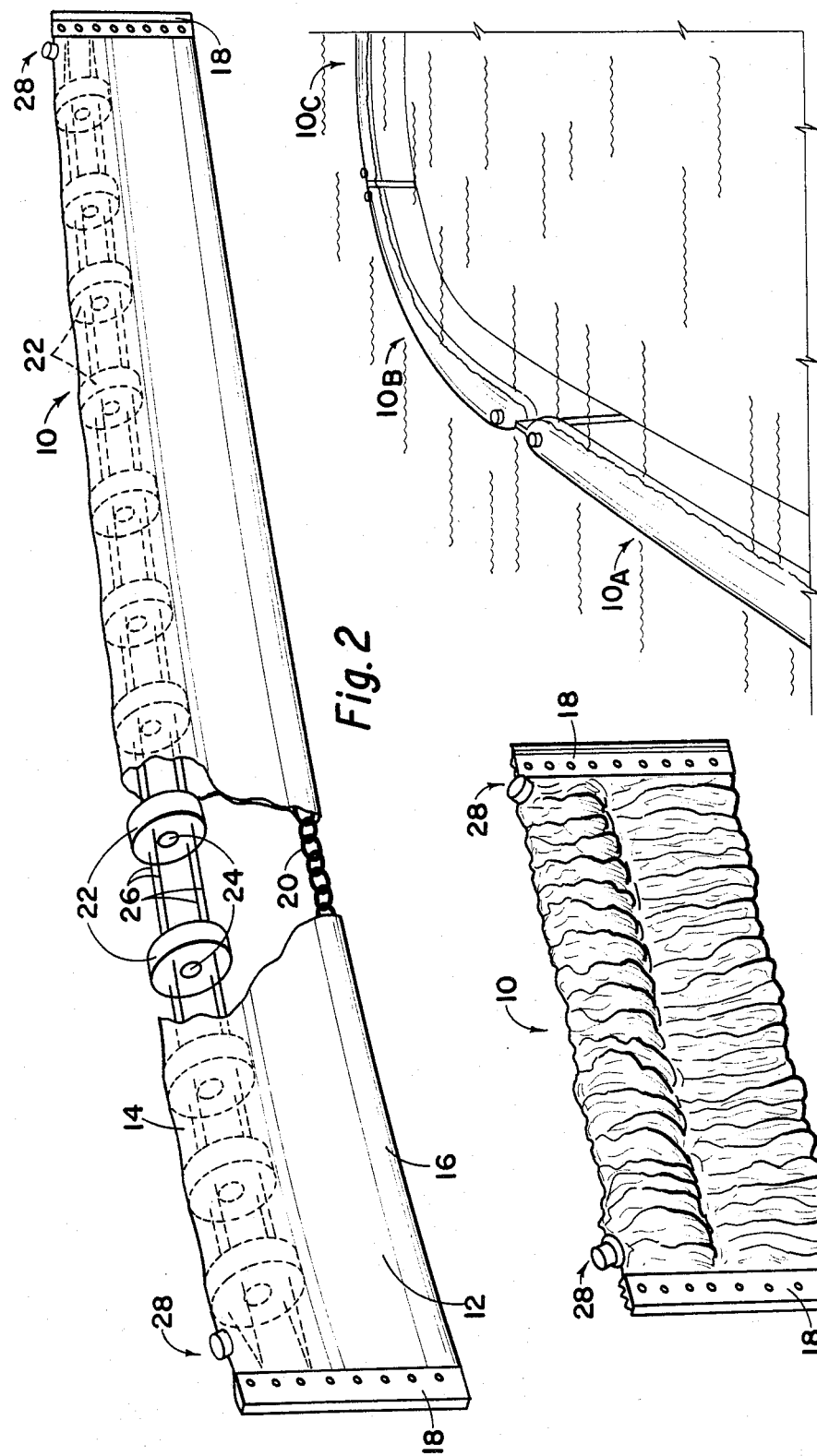

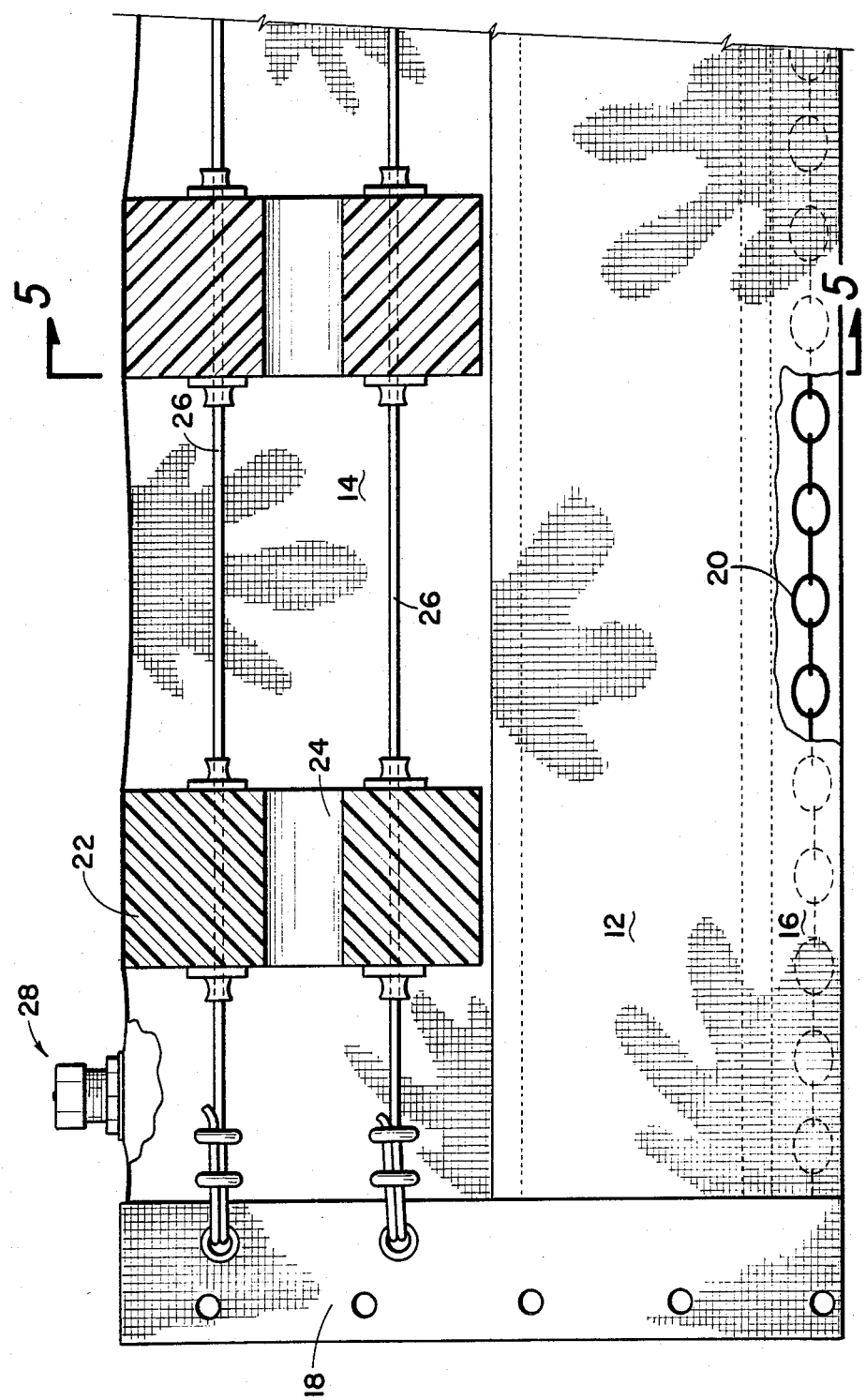

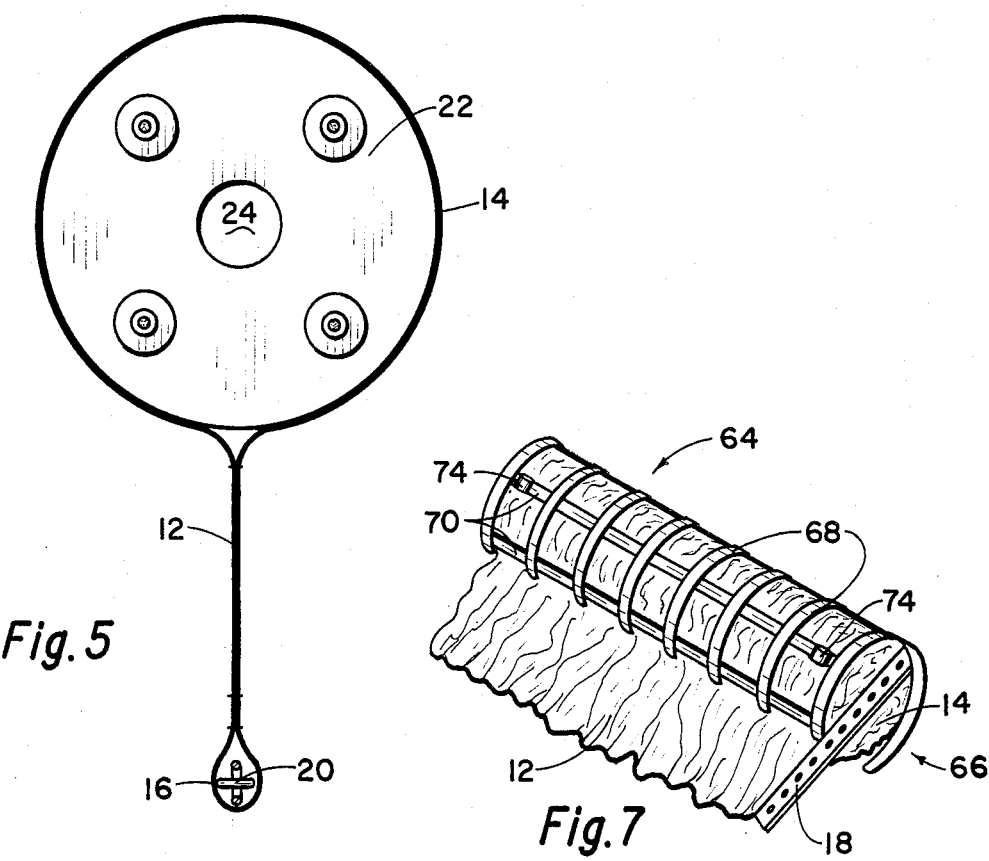
Fig. 5
Fig. 7
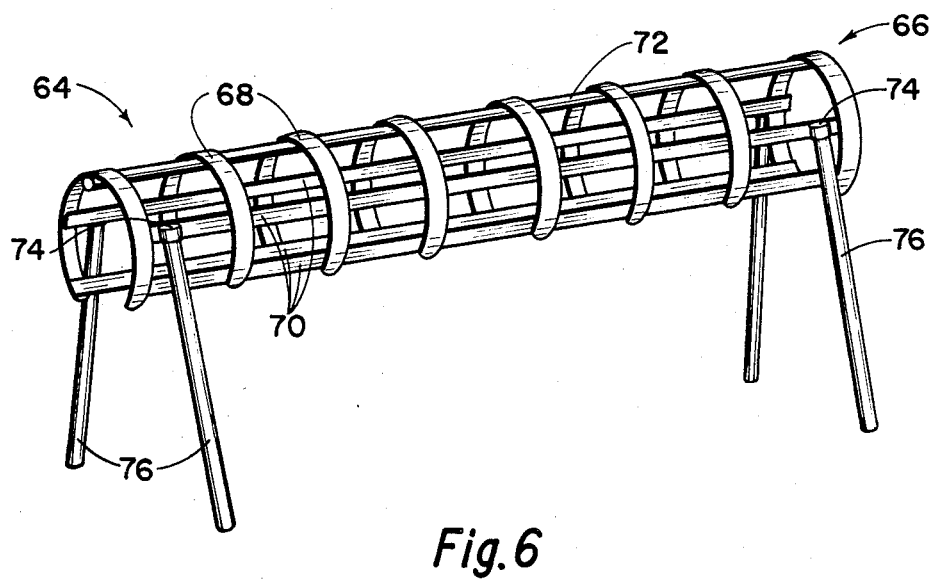
Fig. 6

SELF-INFLATING OIL SPILL BOOM

SUMMARY OF THE INVENTION

A large amount of petroleum is transported today by tanker, and serious problems develop when a tanker develops a leak. This can occur because of failure of the tanker itself or accident. When a leak of large proportions develop the petroleum gathers in a film on the surface of the seas and is moved by currents, wind and wave action. When a floating oil spill reaches shore it can seriously contaminate beaches, lagoons, etc. Not only are such oil spills repugnant to people as they spoil beaches, but they can represent a serious threat to wildlife.

This invention is directed towards a means of quickly erecting a confinement fence around a spill or around an area in which discharged petroleum, or other chemicals, float on the surface of water. Others have devised floating-type booms and background reference may be had to the following U.S. Pat. Nos. 105,913; 205,617; 232,951; 679,519; 1,620,421; 3,579,994; 3,686,869; 3,798,911; 3,919,847; 4,244,819; 4,111,228.

A serious problem with most booms as they exist today is that of rapid deployment. To confine an oil spill (the term oil spill will be used herein as it relates to a spill of any immiscible chemical of specific gravity less than water) is to rapidly encircle the spreading film and confine it so that it can be retrieved or otherwise treated so as not to harm the environment. To accomplish this a floatation device must be positioned on the water surface. This means that a light, flexible, enlongated member must be employed. The use of such members has been known, but a difficult problem exists in the time it takes to inflate portions thereof so that they will float when on the water. The present invention provides a collapsible curtain configured in such a way that it can be stored compactly and can be quickly deployed and extended in an elongated manner and in such a way that during such extension the boom is automatically inflated without the use of air pressure equipment.

To accomplish this objective the collapsible boom is formed of an elongated curtain of flexible material having an upper and a lower edge. The upper edge is formed into an upper portion of tubular configuration. A flexible ballast is secured to the curtain lower edge which may be such as in the form of a chain.

Contained within the upper tubular edge are a plurality of spaced apart short length cylindrical floats which may preferably be made of material such as plastic foam. These floats are secured to each other such as by the means of rope or cord within the curtain tubular upper portions. Each float has a hole through it so that air can freely pass back and forth through the floats within the curtain tubular upper portion.

To control the air flow into the curtain there is placed at least one, and preferably one adjacent each end of the curtain, a short length tubular member of rigid material threaded to receive a cap. The cap has holes in the top and has a flexible washer secured at its middle to the inside of the cap top surface. The tubular member has holes in the tubular walls adjacent the upper open end thereof. When the cap is fully screwed down against the tubular portion it is blocked against the flow of air in or out. When it is screwed all the way out air freely flows through the tubular member, such as during deflation of the curtain for returning it to condition. The cap has an intermediate position in which it is slightly open allowing the flexible seal to be displaced to allow air to enter into the upper interior tubular edge of the curtain, but which closes against the lid upper surface to prohibit air from flowing outwardly.

The invention also includes a storage rack having means to telescopically receive the curtain upper tubular portion therein and to allow the curtain to hang downwardly with the ballast lower edge hanging below the rack. The rack thus permits compact storage but facilitates immediate deployment of the curtain. By the unique design of the tubular upper edge, as the curtain is deployed it automatically inflates itself. After inflation the caps at each end of the curtain are closed and it is ready for extended use on the surface of the water.

A better understanding of the invention will be had with reference to the following description and claims, taken in conjunction with the attached drawings.

DESCRIPTION OF THE DRAWING

FIG. 1 is an isometric view of a collapsible boom shown in the collapsed position.

FIG. 2 is a view of the boom of FIG. 1, shown partially cut away and shown in the extended position as occurs when the boom is in use.

FIG. 3 shows the boom in use with sections of the boom secured end to end to achieve the desired total length of the boom necessary to confine an oil spill.

FIG. 4 is an enlarged elevational view of the boom of FIGS. 1 and 2, showing a short length of the boom and showing the curtain broken away to reveal the internal arrangement of the upper tubular portion.

FIG. 5 is a cross-sectional view of the boom.

FIG. 6 is an isometric view of a rack for use in storing the collapsible boom.

FIG. 7 is an isometric view showing a boom segment as stored in a rack, the rack being shown without legs and being shown in reduced scale compared to that of FIG 6.

DETAILED DESCRIPTION OF PREFERRED EMBODIMENT OF THE INVENTION

Figure 8:
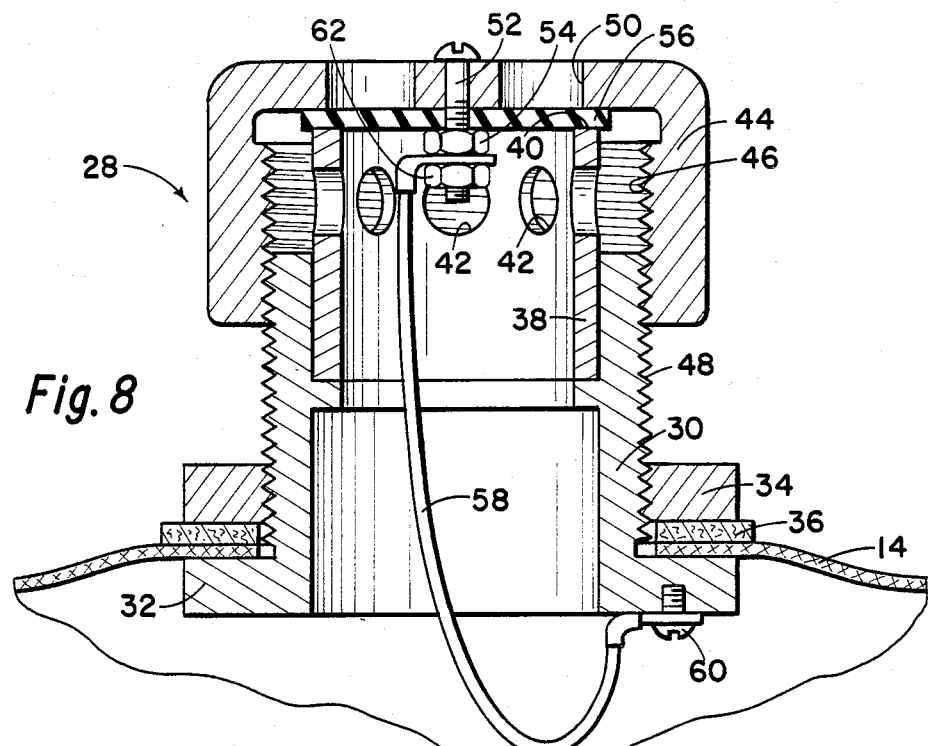
FIG. 8 is an enlarged cross-sectional view of an air valve by which the flow of air into and from the curtain upper tubular portion is controlled. The valve is shown in closed position.

Referring to the drawings and first to FIGS. 1, 2, and 3 a self-inflating oil spill confinement boom is shown. The boom is in the form of sections, one section being generally indicated by the numeral 10 in FIGS. 1 and 2. Portions of three sections 10A, 10B and 10C are shown in reduced scale in FIG. 3, the sections being joined together and shown floating on water such as to confine an oil spill.

Each section of the oil spill confinement boom consists of an elongated flexible curtain which, as shown in FIGS. 4 and 5 has an intermediate portion 12, an upper tubular portion 14 and a lower ballast portion 16. The upper tubular portion 14 and the lower ballast portion 16 can be achieved by sewing the elongated curtain material as shown, it being important that the seam forming the upper tubular portion be substantially air tight.

At each end of the curtain a rigid connector portion 18 is provided. These are arranged to be interlocked with each other so that as shown in FIG. 3, the sections of the curtain can be quickly joined to provide an elongated wall of length sufficient to encircle and confine an oil spill.

The ballast portion 16 of the curtain contains a flexible ballast member, that is, a weighted member which can conveniently be formed by a chain 20.

The essence of the invention is a means by which the upper tubular portion 14 is self-inflated when the oil spill boom 10 is stretched from its collapsed position as in FIG. 1 to an elongated position as is moved for use on water. This is achieved by the use of a plurality of short length cylindrical floats 22, each having an external diameter conforming to the internal diameter of the curtain tubular portion 14, as shown in FIG. 5. Each float 22 has a hole 24 through it so as to freely permit the passage of air past the float. As shown best in FIGS. 2, 4 and 5, the floats 22 are held in proper position relative to the curtain by the means of ropes 26, there being four ropes shown in the embodiment illustrated although it can be seen that a greater or lesser number may be utilized. Ropes 26 allow the floats to be moved adjacent each other when the boom is in the collapsed position but to freely allow the floats to be moved apart from each other as the curtain is expanded as it is removed from stored position to the elongated condition wherein it is used on water. The ropes 26 are attached at each end to the connector portions 18.

In order for the collapsible boom to be self-inflating at least one air valve is provided in the upper tubular portions 14 and in the preferred embodiment as illustrated, an air valve generally indicated by the numeral 28 is provided adjacent each end of the curtain. The function of each air valve is to readily permit the flow of air into the upper tubular portion 14 as the collapsible curtain is extended outwardly to its elongated position preparatory to placing it in water. The air valve must also function to prohibit air from escaping while the curtain is being used as an oil confinement boom. A third function is, to permit air to be readily exhausted from the curtain when it is collapsed to a stored position.

Referring to FIGS. 8 through 11 the details of the air valve of this invention are illustrated. The valve is formed of a rigid tubular portion 30 which has means such as an integral flange 32 on the lower end to seal it to the curtain upper tubular portion 14. In the preferred arrangement illustrated the tubular portion 30 is externally threaded and an internally threaded nut 34 and washer 36 of resilient material are used to seal the tubular portion to the curtain upper tubular portion.

The tubular body 30 receives an upper tubular extension 38 having an upper peripheral edge 40 and having a plurality of openings 42 in the side wall adjacent the upper edge 40.

Figure 9:
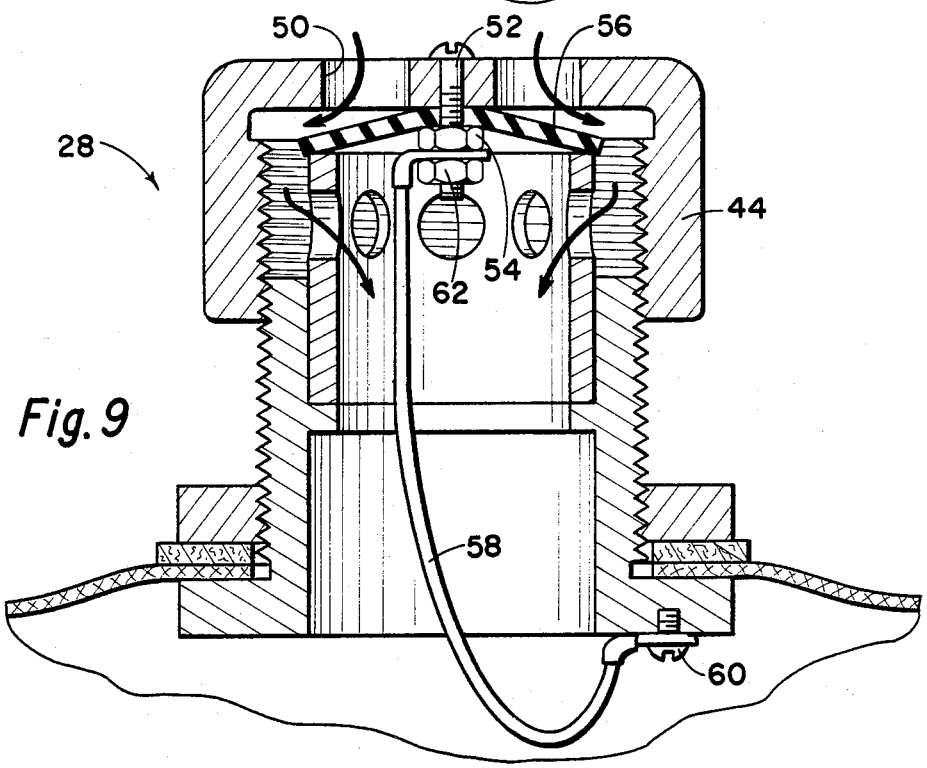
FIG. 9 shows the air valve in intermediate position.

A cap 44 has internal threads 46 so as to engage the external threads 48 on tubular body 30. Cap 44 has openings 50 in the top thereof. By means of a bolt 52 and nut 54 a flexible washer 56 is secured to the cap top inner surface. The washer 56 is of a diameter to fully cover the openings 50 but will flex, as shown in FIG. 9 to permit air to be drawn into the interior of the curtain upper tubular portion when cap 44 is loosened to an intermediate position, but yet remains in place. When the cap 44 is screwed downwardly to the closed position as in FIG. 8, washer 56 engages the upper edge 40 of the tubular extension 38 closing the air valve against the flow either inwardly or, more important, outwardly, of the curtain tubular portion.

A cord 58 has one end secured by a screw 60 to the tubular body flange portion 32 and the upper end is connected to bolt 52 and held in place by a second nut 62.

Figure 11:
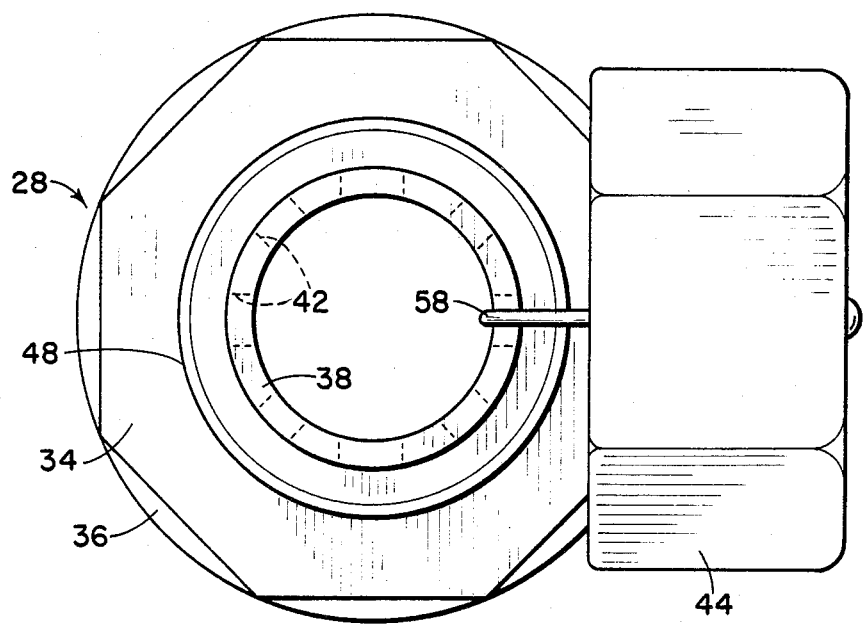
FIG. 11 is the top view of FIG. 10.
Figure 10:
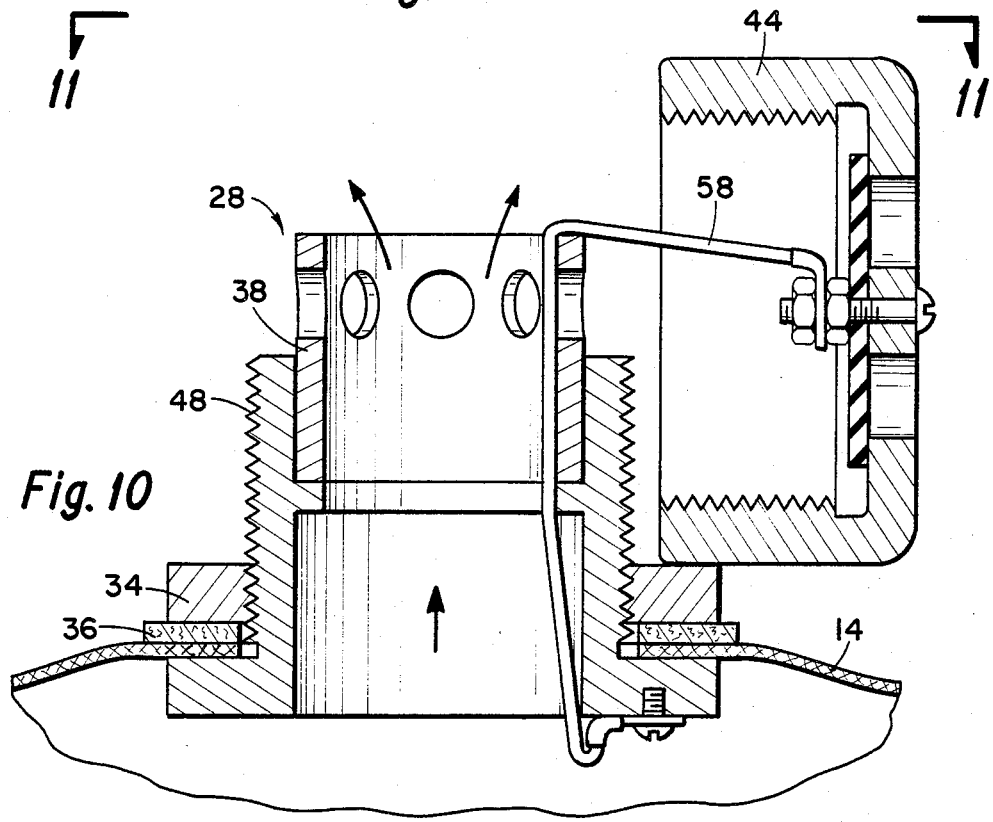
FIG. 10 shows the air valve with the cap fully removed to permit air to freely flow out as occurs when the curtain is being restored to the collapsed position.

The three modes of use of the air valve 28 are shown. While the expandable curtain is in the collapsed or stored position the air valve can be left as in FIG. 9, that is, with the cap 44 in place but not closed which permits the washer 56 to deflect downwardly. When the boom is to be used it is immediately moved from the collapsed to the extended position. As the upper tubular portion extends and is held open by floats 22, air is freely drawn into the upper tubular portion thereby inflating it. Washer 56 permits air from being inadvertently moved outwardly. Thus, the movement of the boom will serve to cause air to flow in but prevent it from being discharged. When the boom is completely inflated, such as when it is first positioned in the water or, before being positioned in the water if it is fully inflated, cap 44 is preferably closed as shown in FIG. 8 so as to permit any inadvertent discharge of air from the inflated boom. After the use of the boom is complete and it has been taken from the water and it iss ready to be returned to the collapsed or stored position, the cap 44 is removed as shown in FIGS. 10 and 11 to permit air to be freely discharged so that the boom can be collapsed into a relatively small length compared to the total length as it is used.

To retain the boom in a ready position, the frame of FIGS. 6 and 7 is used. FIG. 6 shows a frame generally indicated by the numeral 64. The frame includes a generally circular upper frame portion 66 provided by a plurality of spaced apart ribs 68. While eight ribs 68 are shown, a lesser or greater number may be employed. The ribs are circular in configuration but opened at the bottom. Extending between the ribs are long arms 70 preferably made such as of bar stock and preferably welded to the inside of the ribs. The ribs themselves may be formed such as of ¾ inch pipe. The top long arm 72 is preferably formed of material having a circular cross-section such as of ¾ inch pipe to provide a hand hold so that the device can be easily moved around. Affixed to two of the long arms are sockets 74, there being four employed, each of which receives the upper end of a leg 76 which may be made such as of ½ inch diameter pipe. The interior circular dimensions of the upper frame portion 66 are such as to freely receive the collapsed curtain which means that the interior diameter of the upper frame portion must be greater than the diameter of floats 22. The open lower end of the upper frame portion allows the curtain intermediate portion 12 to hang downwardly. This is shown in FIG. 7 which shows the frame upper portion 66 but does not show the legs so as to show how the frame upper portion 66 receives the collapsed curtain upper portion 14.

By the use of the frame shown in FIGS. 6 and 7 the collapsible self-inflating oil spill confinement boom is stored ready for immediate use. When it is necessary to deploy the curtain all that is required is that one end be taken hold of and the curtain extended. As this happens the boom will self-inflate. After it has self-inflated caps 44 can be closed. The boom segments can be joined together as they are placed in the water to form a boom of the maximum length required. Thus, the boom may be very expeditiously deployed since it does not require time to inflate it by the use of a source of air pressure. In addition, when the boom is removed from the water and is returned to the stored position utilizing the frame 64, each segment is stored in a relatively compact arrangement, ready for immediate deployment.

While the invention has been described with a certain degree of particularlity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A collapsible boom for use in confining oil spills on water comprising:
    an elongated curtain of flexible material having an upper and lower edge, the upper edge being formed into an upper portion of tubular configuration;
    flexible ballast means affixed to said curtain lower edge;
    a plurality of spaced-apart short length cylindrical floats positioned in said curtain tubular upper edge, each float having means permitting the passage of air therepast; and
    means to permit air to be drawn into said curtain tubular upper edge when said curtain is stretched from a collapsed to an elongated position and means to retain air trapped therein whereby said upper tubular portion floats on water.

2. A collapsible boom according to claim 1 wherein said ballast means includes chain means.

3. A collapsible boom according to claim 2 wherein said chain means is retained in a tubular configured integral portion of said curtain forming said lower edges.

4. A collpasible boom according to claim 1 including rope means between each said floats.

5. A collapsible boom according to claim 1 wherein said means to permit air to flow into said curtain tubular upper portion includes means to permit air to flow in and to resist outward flow of air.

6. A collapsible boom according to claim 5 wherein said curtain tubular upper portion includes a short length tubular rigid externally threaded member;
    a cap having a top portion having an inner surface and an integral tubular portion having internal threads receivable on said rigid tubular member and having at least one opening in said top portion; and
    a flexible impervious washer member secured to said cap top portion inner surface, the washer member flexing to permit inward air flow through said opening and to close said opening against outward air flow.

7. A collapsible boom according to claim 6 wherein said tubular rigid portion has an upper peripheral edge and wherein said flexible washer is of diameter to extend over said upper peripheral edge whereby said cap may be closed to seal said washer against said edge to close said tubular member against inward or outward air flow.

8. A collapsible boom according to claim 1 including:
    a support frame for receiving said curtain upper tubular portion therein and permitting said curtain and said ballast means to hang downwardly therefrom.

9. A collapsible boom according to claim 8 wherein said support frame comprises:
    an elongated upper frame portion of generally horizontal tubular configuration having a slot opening in the bottom thereof, the internal diameter being greater than the diameter of said floats, the upper frame portion being open at one end whereby said curtain upper tubular portion may be slipped into said frame upper tubular portion, said curtain hanging downwardly through the slot opening; and
    leg means supporting said upper frame portion to a height to allow said curtain and said ballast means to hang downwardly therefrom.

* * * * *